(12) United States Patent
Ozaki

(10) Patent No.: US 12,540,732 B2
(45) Date of Patent: Feb. 3, 2026

(54) COMBUSTOR OF GAS TURBINE

(71) Applicant: KAWASAKI JUKOGYO KABUSHIKI KAISHA, Kobe (JP)

(72) Inventor: Yoshihiko Ozaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/724,246

(22) PCT Filed: Dec. 23, 2022

(86) PCT No.: PCT/JP2022/047574
§ 371 (c)(1),
(2) Date: Jun. 26, 2024

(87) PCT Pub. No.: WO2023/127718
PCT Pub. Date: Jul. 6, 2023

(65) Prior Publication Data
US 2025/0067433 A1    Feb. 27, 2025

(30) Foreign Application Priority Data
Dec. 27, 2021    (JP) ................... 2021-211923

(51) Int. Cl.
*F23R 3/00* (2006.01)
*F23R 3/50* (2006.01)

(52) U.S. Cl.
CPC ................ *F23R 3/002* (2013.01); *F23R 3/50* (2013.01); *F23R 2900/00012* (2013.01); *F23R 2900/03041* (2013.01); *F23R 2900/03043* (2013.01)

(58) Field of Classification Search
CPC .... F23R 3/002; F23R 3/04; F23R 3/06; F23R 2900/03041; F23R 2900/03043; F23R 2900/03044; F23R 2900/00012
See application file for complete search history.

(56) References Cited

U.S. PATENT DOCUMENTS

| | | | |
|---|---|---|---|
| 4,642,993 A * | 2/1987 | Sweet | F23R 3/002 |
| | | | 428/116 |
| 4,695,247 A | 9/1987 | Enzaki et al. | |
| 4,749,029 A * | 6/1988 | Becker | F23R 3/002 |
| | | | 165/47 |
| 6,182,451 B1 | 2/2001 | Hadder | |

(Continued)

FOREIGN PATENT DOCUMENTS

| | | |
|---|---|---|
| JP | 10-082527 A | 3/1998 |
| JP | 2014-159904 A | 9/2014 |

(Continued)

*Primary Examiner* — Alain Chau
(74) *Attorney, Agent, or Firm* — Sughrue Mion, PLLC

(57) ABSTRACT

A combustor of a gas turbine includes: a shell made of metal; a liner located inside the shell and made of a ceramic matrix composite, the liner including an inner surface defining a combustion chamber, an outer surface facing a side opposite to a side where the combustion chamber is located, and at least one cooling hole that is open toward the combustion chamber, and a cooling chamber defined between the shell and the liner. The shell includes a tubular shell main body and a seal wall structure projecting from an inner surface of the shell main body toward the liner.

8 Claims, 5 Drawing Sheets

(56) References Cited

U.S. PATENT DOCUMENTS

| | | | |
|---|---|---|---|
| 7,219,498 B2* | 5/2007 | Hadder | F23R 3/007 |
| | | | 60/752 |
| 8,667,682 B2* | 3/2014 | Lee | F01D 9/023 |
| | | | 60/39.01 |
| 8,727,714 B2* | 5/2014 | Snider | F23R 3/002 |
| | | | 415/178 |
| 9,239,165 B2* | 1/2016 | Cunha | F23R 3/005 |
| 10,113,745 B2* | 10/2018 | Torkaman | F23R 3/002 |
| 10,788,211 B2* | 9/2020 | Pettersson | F02K 1/827 |
| 11,221,140 B2* | 1/2022 | Shi | F23R 3/60 |
| 11,268,698 B2* | 3/2022 | Lee | F23R 3/04 |
| 11,608,985 B2* | 3/2023 | Lee | F02C 7/18 |
| 2006/0053798 A1* | 3/2006 | Hadder | F23R 3/007 |
| | | | 60/754 |
| 2009/0260364 A1 | 10/2009 | Keller et al. | |
| 2009/0277180 A1* | 11/2009 | Lam | F23R 3/002 |
| | | | 60/752 |
| 2011/0016869 A1 | 1/2011 | Iwasaki | |
| 2012/0167574 A1* | 7/2012 | Uskert | F23M 20/005 |
| | | | 60/754 |
| 2013/0327048 A1* | 12/2013 | Cunha | F23R 3/06 |
| | | | 60/754 |
| 2013/0327049 A1* | 12/2013 | Cunha | F23R 3/007 |
| | | | 60/754 |
| 2014/0230442 A1 | 8/2014 | Yokota et al. | |
| 2014/0238031 A1* | 8/2014 | Okita | F23R 3/60 |
| | | | 60/754 |
| 2014/0290256 A1* | 10/2014 | Fujimoto | F01D 5/187 |
| | | | 60/752 |
| 2015/0292742 A1 | 10/2015 | Spence et al. | |
| 2016/0047312 A1* | 2/2016 | Hase | F23R 3/005 |
| | | | 60/806 |
| 2016/0061448 A1* | 3/2016 | Davenport | F23R 3/06 |
| | | | 60/753 |
| 2016/0186997 A1* | 6/2016 | Sadil | F02C 7/16 |
| | | | 411/347 |
| 2016/0281987 A1* | 9/2016 | Torkaman | F23R 3/02 |
| 2017/0138596 A1* | 5/2017 | Freeman | F23R 3/10 |
| 2018/0010798 A1* | 1/2018 | Pettersson | F02K 1/827 |
| 2018/0292089 A1 | 10/2018 | Porter et al. | |
| 2018/0306120 A1* | 10/2018 | Shi | F16J 15/441 |
| 2019/0017705 A1* | 1/2019 | Liu | F23R 3/002 |
| 2019/0086083 A1* | 3/2019 | Kim | F23R 3/12 |
| 2019/0128524 A1* | 5/2019 | Lee | F23R 3/04 |
| 2019/0264923 A1 | 8/2019 | Kobayashi et al. | |
| 2022/0127963 A1* | 4/2022 | Lee | F01D 5/18 |
| 2022/0146098 A1* | 5/2022 | Lee | F23R 3/04 |
| 2022/0299206 A1* | 9/2022 | Quach | F23R 3/50 |

FOREIGN PATENT DOCUMENTS

| | | |
|---|---|---|
| WO | 2009/122474 A1 | 10/2009 |
| WO | 2018/087878 A1 | 5/2018 |

* cited by examiner

COMBUSTOR OF GAS TURBINE

CROSS REFERENCE TO RELATED APPLICATIONS

This application is a National Stage of International Application No. PCT/JP2022/047574 filed Dec. 23, 2022, claiming priority based on Japanese Patent Application No. 2021-211923 filed Dec. 27, 2021, the entire contents of which are incorporated in their entirety.

TECHNICAL FIELD

The present disclosure relates to a combustor of a gas turbine.

BACKGROUND ART

To realize high-temperature high-pressure combustion for the purpose of the improvement of fuel efficiency, the improvement of heatproof temperatures of parts of combustors of gas turbines are required. It is known that a liner defining a combustion chamber of the combustor may be formed by a ceramic matrix composite (CMC) instead of metal. The CMC is lighter than metal. Since the heatproof temperature of the CMC is high, the amount of cooling air can be reduced while realizing high-temperature high-pressure combustion. Therefore, when the liner is made of the CMC, the fuel efficiency of the gas turbine can be improved.

PTL 1 discloses that a liner (heat shield) located at a radially inner side of a shell of the combustor is cooled. A cooling chamber is located between the shell and the liner. The shell includes an opening through which cooling air is introduced into the cooling chamber. The liner includes a cooling hole through which the cooling air flows out from the cooling chamber to the combustion chamber.

CITATION LIST

Patent Literature

PTL 1: U.S. Patent Application Publication No. 2018/0292089

SUMMARY OF INVENTION

Technical Problem

In the configuration of PTL 1, to make the cooling air adequately flow out from the cooling hole of the liner to cool an inner peripheral surface of the liner, an adequate pressure difference is required between the cooling chamber and the combustion chamber. Therefore, it is preferable that unintended leak of the cooling air of the cooling chamber do not occur. However, when the liner is made of the CMC, the degree of freedom of the shape of the liner is low. Therefore, it is difficult to prevent the leak of the cooling air of the cooling chamber.

An object of the present disclosure is to seal a cooling chamber of a combustor of a gas turbine while facilitating the manufacture of a CMC liner.

Solution to Problem

A combustor of a gas turbine according to one aspect the present disclosure includes: a shell including metal; a liner located inside the shell and including a ceramic matrix composite, the liner including an inner surface defining a combustion chamber, an outer surface facing a side opposite to a side where the combustion chamber is located, and at least one cooling hole that is open toward the combustion chamber; and a cooling chamber defined between the shell and the liner. The shell includes a tubular shell main body and a seal wall structure projecting from an inner surface of the shell main body toward the liner.

Advantageous Effects of Invention

According to one aspect of the present disclosure, the seal wall structure projects from the shell made of metal, and the CMC liner is prevented from becoming complex. Therefore, the cooling chamber can be sealed by the seal wall structure while facilitating the manufacture of the CMC liner.

DESCRIPTION OF EMBODIMENTS

Figure 1:
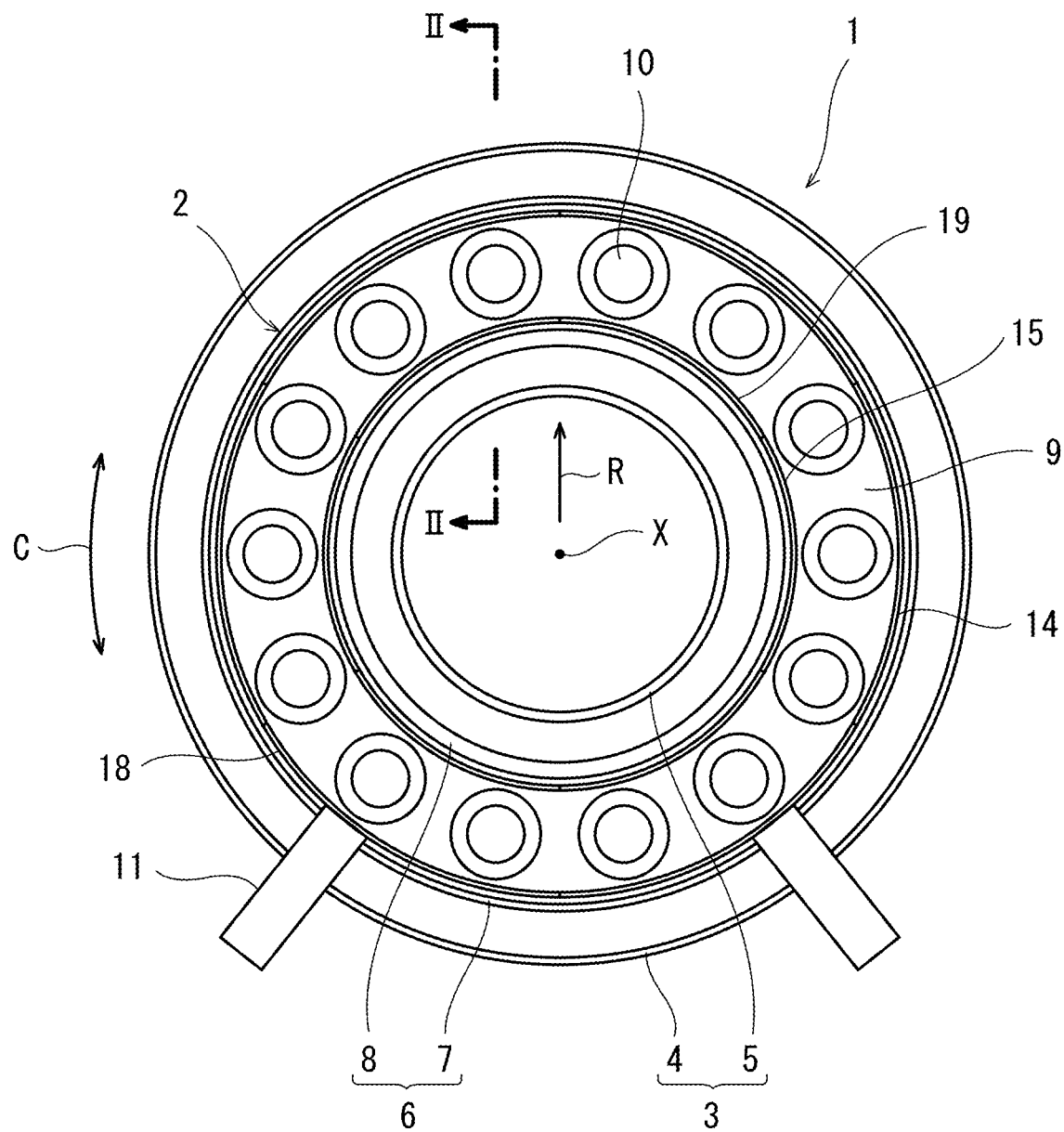
FIG. 1 is a sectional view showing a combustor of a gas turbine according to Embodiment 1 when viewed from a downstream side in a flow direction.

Hereinafter, an embodiment will be described with reference to the drawings. An axis X of a gas turbine 1 is the same as an axis of a combustor 2. A direction orthogonal to the axis X of the combustor 2 is referred to as a radial direction R of the combustor 2, and a direction around the axis X is referred to as a circumferential direction C of the combustor 2. In a flow direction F in a combustion chamber 9, a side where fuel injectors 10 are located is referred to as an upstream side, and a side where an exhaust port 9a is located is referred to as a downstream side.

FIG. 1 is a schematic diagram showing the combustor 2 of the gas turbine 1 according to the embodiment when viewed from the downstream side in the flow direction. As shown in FIG. 1, the combustor 2 is a combustor of the gas turbine 1 used as an aircraft engine. The combustor 2 mixes compressed air, supplied from a compressor, with fuel to generate a fuel-air mixture, and combusts the fuel-air mixture. Thus, the combustor 2 generates a high-temperature high-pressure combustion gas. The generated combustion gas is supplied to a turbine to drive the turbine.

The combustor 2 has a tubular shape and for example, is of an annular type formed in an annular shape surrounding the axis X of the gas turbine 1. The combustor 2 may be of a type other than the annular type. The combustor 2 includes a casing 3. The casing 3 includes an annular outer casing 4 and an annular inner casing 5 which is concentrically located inside the outer casing 4. An annular internal space is defined by the outer casing 4 and the inner casing 5. An inside of the combustor 2 denotes an inside of the outer casing 4 in the radial direction R and an outside of the inner casing 5 in the radial direction R.

A shell 6 is located in the annular internal space of the casing 3 and is a combustion liner that is concentric with the casing 3. The shell 6 is made of metal. The shell 6 includes an annular outer shell 7 and an annular inner shell 8 which is concentrically located inside the outer shell 7. The shell 6 defines an annular space by the outer shell 7 and the inner shell 8. The annular space surrounded by the outer shell 7 and the inner shell 8 is utilized as the combustion chamber 9. An inside of the shell 6 denotes an inside of the outer shell 7 in the radial direction R and an outside of the inner shell 8 in the radial direction R.

Fuel injectors 10 that inject the fuel into the combustion chamber 9 are located annularly along the combustion chamber 9 at the upstream side of the combustion chamber 9. The fuel injectors 10 are lined up in the circumferential direction C on a virtual circle that is concentric with the shell 6. Ignition plugs 11 are located at the shell 6 and generate sparks to ignite the fuel-air mixture in the combustion chamber 9 at the start of the gas turbine 1. An outer liner 14 is located inside the tubular outer shell 7 in the radial direction R. An inner liner 15 is located outside the tubular inner shell 8 in the radial direction R. The outer liner 14 may be an assembly of panels 18 which are adjacently lined up in the circumferential direction to have a tubular shape. Similarly, the inner liner 15 may be an assembly of panels 19 which are adjacently lined up in the circumferential direction to have a tubular shape. One or each of the outer liner 14 and the inner liner 15 may be a tubular body formed in a tubular shape by integral molding without being divided into panels lined up in the circumferential direction.

Figure 2:
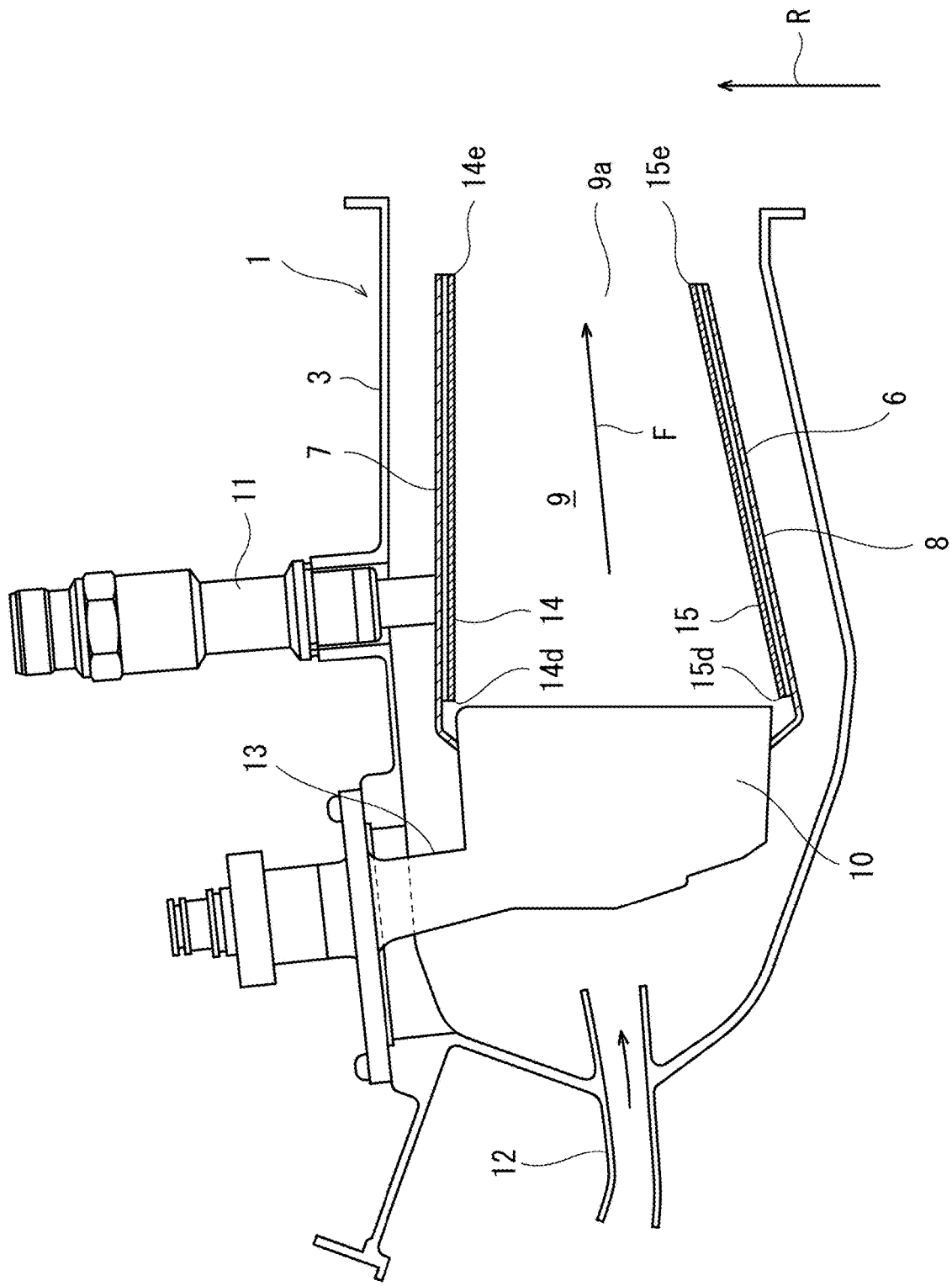
FIG. 2 is a sectional view taken along line II-II of FIG. 1 showing the combustor.

FIG. 2 is a sectional view taken along line II-II of FIG. 1 showing the combustor 2. As shown in FIG. 2, a diffuser 12 is located at an upstream portion of the casing 3 and takes the compressed air, generated by the compressor, in the casing 3. The fuel injectors 10 are supported by a stem 13 fixed to the casing 3. Part of the compressed air which has been taken in the casing 3 is supplied to the fuel injectors 10 for combustion. The rest of the compressed air which has been taken in the casing 3 cools an outer surface of the shell 6, and part of the rest of the compressed air which has been taken in the casing is supplied as cooling air into the shell 6 through openings 20c (see FIG. 3) of the shell 6.

The tubular outer liner 14 as a liner is located inside the tubular outer shell 7 in the radial direction R. The tubular inner liner 15 as a liner is located outside the tubular inner shell 8 in the radial direction R. The outer liner 14 and the inner liner 15 are spaced apart from the shell 6. The outer liner 14 and the inner liner 15 define the combustion chamber 9. The gas which has been combusted in the combustion chamber 9 is discharged toward the turbine through the exhaust port 9a which is defined by a downstream end 14c of the outer shell 7 in the flow direction F and a downstream end 15e of the inner shell 8 in the flow direction F.

The outer liner 14 and the inner liner 15 are made of a ceramic matrix composite (CMC). There is a gap between the outer shell 7 and each of both ends 14d and 14e of the outer liner 14 in the flow direction F, and there is also a gap between the inner shell 8 and each of both ends 15d and 15e of the inner liner 15 in the flow direction F. In FIG. 2, a below-described seal wall structure 21 is not shown.

Figure 3:
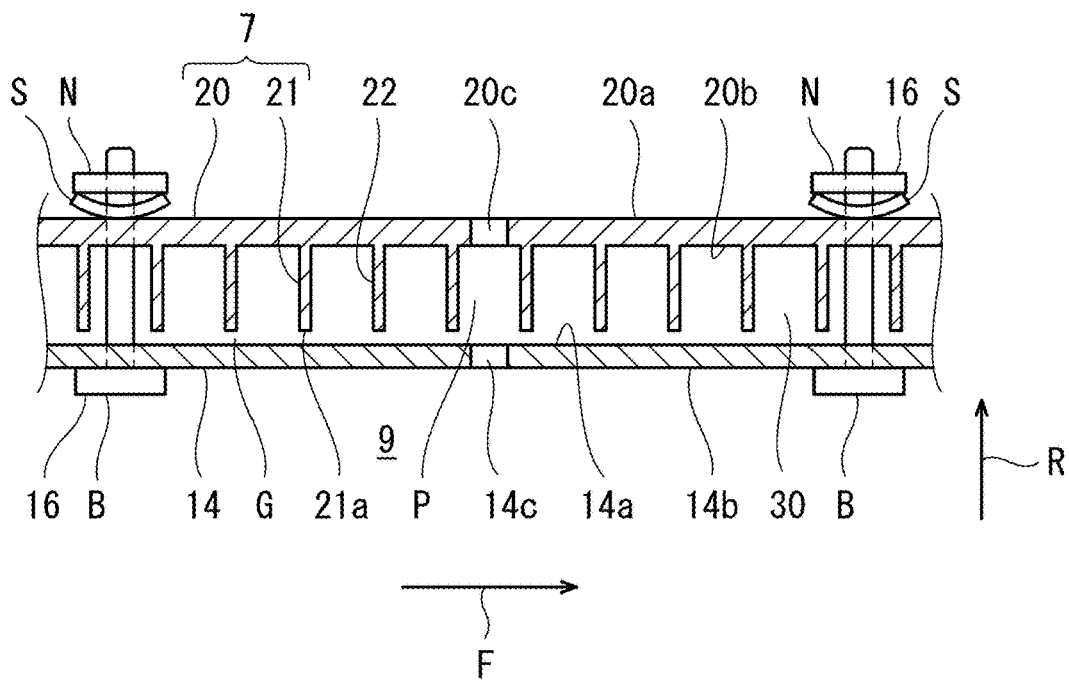
FIG. 3 is a partial sectional view showing the combustor of FIG. 2 when viewed in a circumferential direction.
Figure 4:
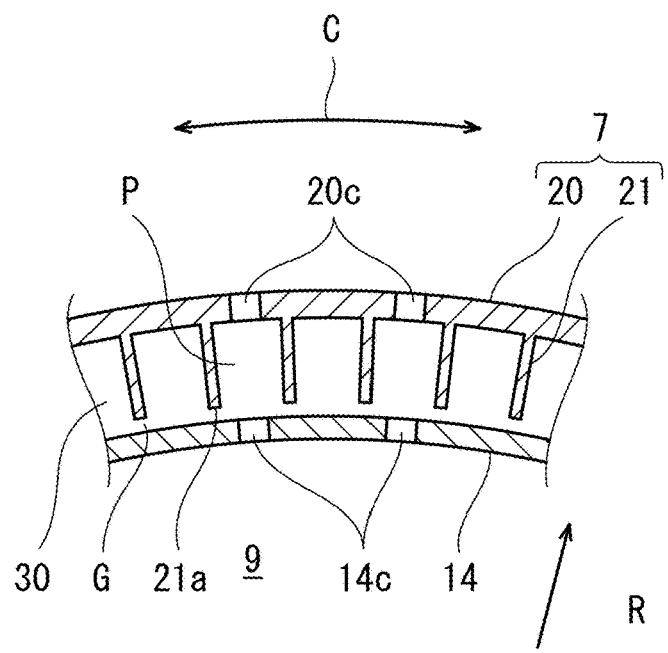
FIG. 4 is a partial sectional view showing the combustor of FIG. 2 when viewed from the downstream side in the flow direction.

Hereinafter, since a seal wall structure of the outer shell 7 and a seal wall structure of the inner shell 8 are the same in configuration as each other, the outer shell 7 will be mainly described. FIG. 3 is a partial sectional view showing the combustor 2 of FIG. 2 when viewed in the circumferential direction C. FIG. 4 is a partial sectional view showing the combustor 2 of FIG. 2 when viewed from the downstream side in the flow direction F. As shown in FIGS. 3 and 4, the outer shell 7 includes a shell main body 20 and the seal wall structure 21. The shell main body 20 has a tubular shape. The shell main body 20 includes: an outer surface 20a facing outward in the radial direction R; and an inner surface 20b facing inward in the radial direction R.

The seal wall structure 21 projects toward the outer liner 14 from the inner surface 20b of the shell main body 20. To be specific, the seal wall structure 21 projects inward in the radial direction R from the inner surface 20b of the shell main body 20. The shell main body 20 and the seal wall structure 21 may be formed as an integrated component, or the seal wall structure 21 as a separate component may be fixed (for example, joined, fastened, or the like) to the shell main body 20.

The outer liner 14 is attached to the outer shell 7 by fasteners 16 so as to be spaced apart from the outer shell 7 by a gap G. To be specific, there is the gap G between an outer surface 14a of the outer liner 14 and a tip 21a of the seal wall structure 21, the tip 21a being located at an inside in the radial direction R. The gap G is larger than an elastically deformable amount of a spring S sandwiched between a nut N and the outer shell 7.

The outer shell 7 is made of metal, and the outer liner 14 is made of the CMC. A coefficient of thermal expansion of the outer shell 7 and a coefficient of thermal expansion of the outer liner 14 are different from each other. Therefore, the size of the gap G may change depending on the temperature of the combustion chamber 9 during the operation of the gas turbine 1. In the present embodiment, the gap G is set to such a size that the tip 21a of the seal wall structure 21 is maintained to be spaced apart from the outer liner 14 in an entire assumed temperature range of the combustion chamber 9 during the operation of the gas turbine 1.

The outer liner 14 includes: the outer surface 14a that faces outward in the radial direction R and is opposed to the outer shell 7; and an inner surface 14b that faces inward in the radial direction R and defines the combustion chamber 9. The outer liner 14 includes cooling holes 14c that are open toward the combustion chamber 9. A space between the outer shell 7 and the outer liner 14 is utilized as a cooling chamber 30. To be specific, the inner surface 20b of the shell main body 20 of the outer shell 7 and the outer surface 14a of the outer liner 14 define the cooling chamber 30.

The configuration of the fastener 16 is not especially limited. As one example, the fastener 16 includes a bolt B, the nut N, and the spring S. For example, the bolt B is attached from a side where the inner surface 14b of the outer liner 14 is located, and the nut N is attached from a side where the outer surface 20a of the shell main body 20 of the outer shell 7 is located. The spring S is sandwiched between the outer surface 20a of the shell main body 20 and the nut N so as to be elastically deformable. The spring S allows the displacement of the outer liner 14 relative to the outer shell 7 in the radial direction R. The spring S may be, for example, a disc spring.

The shell main body 20 includes the openings 20c into which the compressed air that has been taken in the casing 3 (see FIG. 1) is introduced. The compressed air which has been taken in through the openings 20c is supplied as the cooling air to the cooling chamber 30. The cooling air in the cooling chamber 30 cools the outer surface 14a of the outer liner 14. Since the cooling air in the cooling chamber 30 is the compressed air supplied from the compressor located upstream of the combustor 2, the pressure in the cooling chamber 30 is higher than the pressure in the combustion chamber 9. Therefore, the cooling air in the cooling chamber 30 flows out to the combustion chamber 9 through the cooling holes 14c of the outer liner 14. The cooling air which has flowed out through the cooling holes 14c covers the inner surface 14b of the outer liner 14 to reduce the temperature increase of the inner surface 14b of the outer liner 14 which has been increased in temperature by the combustion gas of the combustion chamber 9.

In a section of the cooling chamber 30 when viewed in the circumferential direction C of the combustor 2, the seal wall structure 21 includes wall portions 22 that divide the cooling chamber 30 into cavities P (see FIG. 3). The seal wall structure 21 of the present embodiment is one continuous wall as a whole. However, in a sectional view when viewed in the circumferential direction C, the seal wall structure 21 includes the wall portions 22 that are spaced apart from each other. The wall portions 22 project from the inner surface 20b of the shell main body 20 to the outer liner 14. A projecting end of each wall portion 22 is the tip 21a of the seal wall structure 21. In the section of the cooling chamber 30 when viewed in the circumferential direction C of the combustor 2, the wall portions 22 are lined up at intervals in a direction toward the end of the outer liner 14 from the cavity P that the cooling hole 14c faces among the cavities P. In a section of the cooling chamber 30 when viewed in the flow direction F of the combustor 2, the seal wall structure 21 divides the cooling chamber 30 into the cavities P (see FIG. 4).

Figure 5:
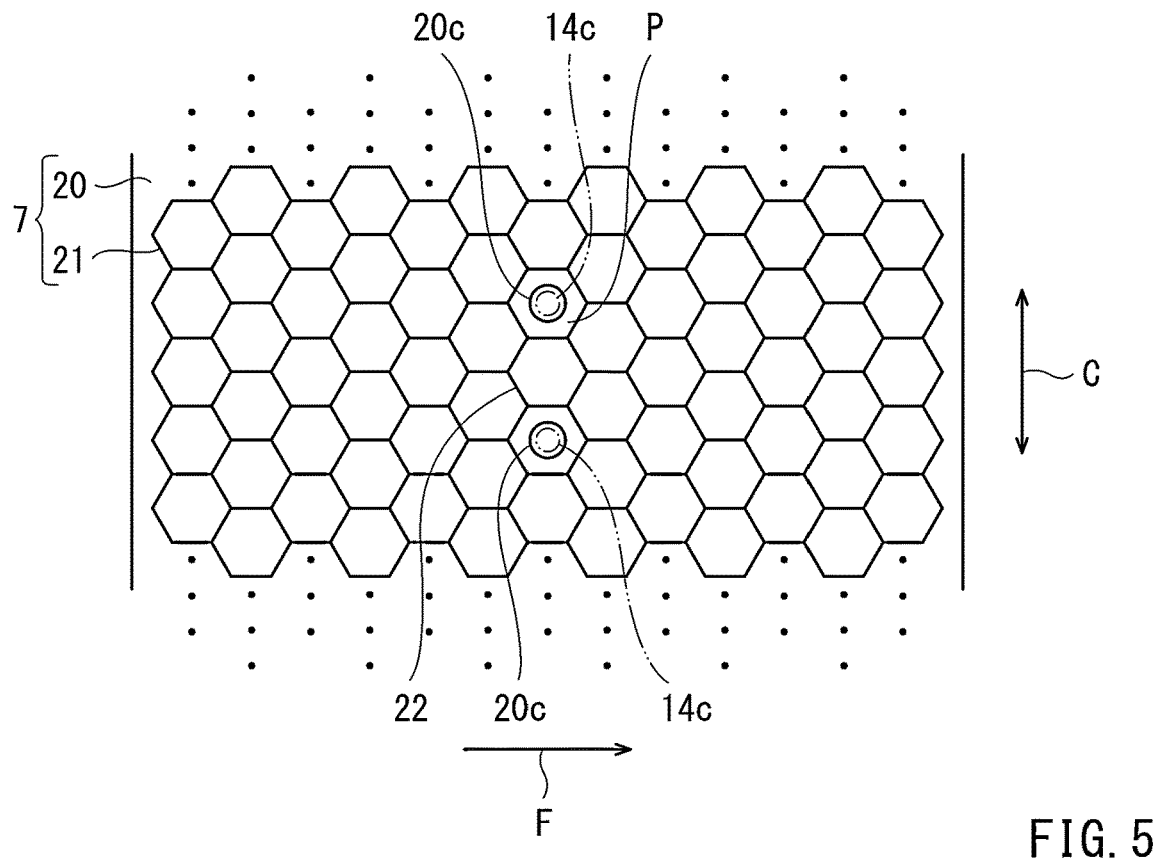
FIG. 5 is a partial development view showing a seal wall structure of the combustor of FIG. 3 when viewed in a projecting direction of the seal wall structure.

FIG. 5 is a partial development view showing the seal wall structure 21 of FIG. 3 when viewed in a projecting direction of the seal wall structure 21. As shown in FIG. 5, the seal wall structure 21 has a honeycomb shape when viewed in the projecting direction (in the present embodiment, the radial direction R) in which the seal wall structure 21 projects from the shell main body 20. To be specific, the seal wall structure 21 includes portions extending in the circumferential direction C and portions extending in the flow direction F. When viewed in the projecting direction, each cooling hole 14c is located within any one of the cavities P. When viewed in the projecting direction, each opening 20c of the shell main body 20 is located within any one of the cavities P. When viewed in the projecting direction, the wall portions 22 of the seal wall structure 21 are located between the cooling holes 14c.

At least one of the openings 20c and at least one of the cooling holes 14c are opposed to the same cavity P. Specifically, any of the openings 20c faces any of the cavities P that the cooling holes 14c face respectively. The cavity P that the cooling hole 14 faces and the cavity P that the opening 20c faces may be different from each other.

When the cooling air which has been introduced into the cooling chamber 30 through the openings 20c flows toward an end of the cooling chamber 30 in the flow direction F, the cooling air receives resistance by the existence of the seal wall structure 21. Specifically, in a region from the cavity P that the cooling hole 14c faces to both ends 14d and 14e (see FIG. 2) of the outer liner 14 in the flow direction F, the narrow gaps G each between the tip 21a of the seal wall structure 21 and the outer surface 14a of the outer liner 14 are lined up in the flow direction F.

Therefore, the cooling air in the cavity P that the cooling hole 14c faces hardly flows to the end of the cooling chamber 30 in the flow direction F by passage resistance of the narrow gap G. As a result, the cooling air in the cooling chamber 30 hardly leaks beyond the end of the outer liner 14, and the pressure in the cooling chamber 30 is kept adequately higher than the pressure in the combustion chamber 9. Thus, the cooling air is appropriately discharged through the cooling holes 14c.

The inner shell 8 also includes the seal wall structure. Since the seal wall structure of the inner shell 8 is the same as the seal wall structure 21 of the outer shell 7, a detailed explanation of the seal wall structure of the inner shell 8 is omitted.

According to the above-described configuration, the seal wall structure 21 projects from the shell 6 made of metal, and the outer liner 14 and the inner liner 15 which are made of the CMC are prevented from becoming complex. Therefore, the cooling chamber 30 can be sealed by the seal wall structure 21 while facilitating the manufacture of the CMC liners 14 and 15.

The fastener 16 includes the spring S that allows the displacement of the liner 14 relative to the shell 6 in the radial direction R, and there is the gap G between the tip 21a of the seal wall structure 21 in the radial direction R and the outer surface 14a of the liner 14. Therefore, the cooling chamber 30 can be sealed by the seal wall structure 21 while allowing the displacement of the liner 14.

The gap G is set to such a size that the tip 21a of the seal wall structure 21 is maintained to be spaced apart from the outer surface 14a of the liner 14 in an entire temperature range of the combustion chamber 9 during the operation of the gas turbine 1. Therefore, the seal wall structure 21 does not interfere with the liner 14, and the generation of local stress applied to the liner 14 can be prevented.

In the section of the cooling chamber 30 when viewed in the circumferential direction C of the combustor 2, the seal wall structure 21 divides the cooling chamber 30 into the cavities P. Therefore, the cooling air in the cooling chamber 30 hardly leaks.

In the section of the cooling chamber 30 when viewed in the circumferential direction C, the wall portions 22 are lined up at intervals in a direction toward the end of the liner 14 from the cavity P that the cooling hole 14c faces among the cavities P. Therefore, portions where the passage resistance is high are lined up, and the cooling air in the cooling chamber 30 hardly leaks.

Since the opening 20c of the shell 7 and the cooling hole 14c of the liner 14 face the same cavity P, the cooling air can be discharged through the cooling hole 14c to the combustion chamber 9 by adequate pressure.

In the section of the cooling chamber 30 when viewed in the flow direction F from the upstream side to the downstream side in the combustor 2, the seal wall structure 21 divides the cooling chamber 30 into the cavities P. Therefore, the cooling air in the cooling chamber 30 hardly leaks.

When viewed in the radial direction R, the seal wall structure 21 includes the wall portions 22 located between the cooling holes 14c. Therefore, the pressure difference between each cooling hole 14c and the combustion chamber 9 can be secured.

When viewed in the radial direction R, the seal wall structure 21 has a honeycomb shape. Therefore, the seal performance of the cooling chamber 30 can be improved while increasing the strength of the shell 6.

Figure 6:
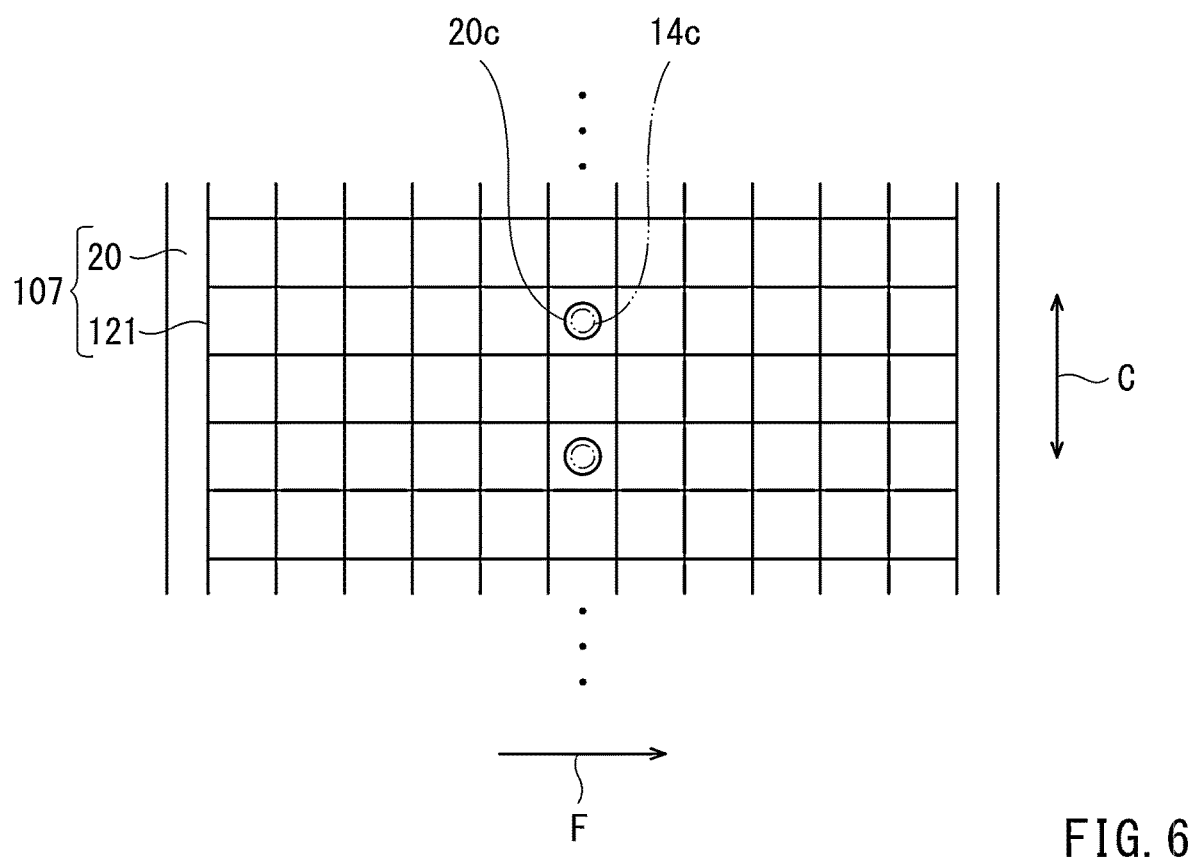
FIG. 6 is a partial development view showing a first modified example of the seal wall structure of FIG. 5 when viewed in the projecting direction of the seal wall structure.
Figure 7:
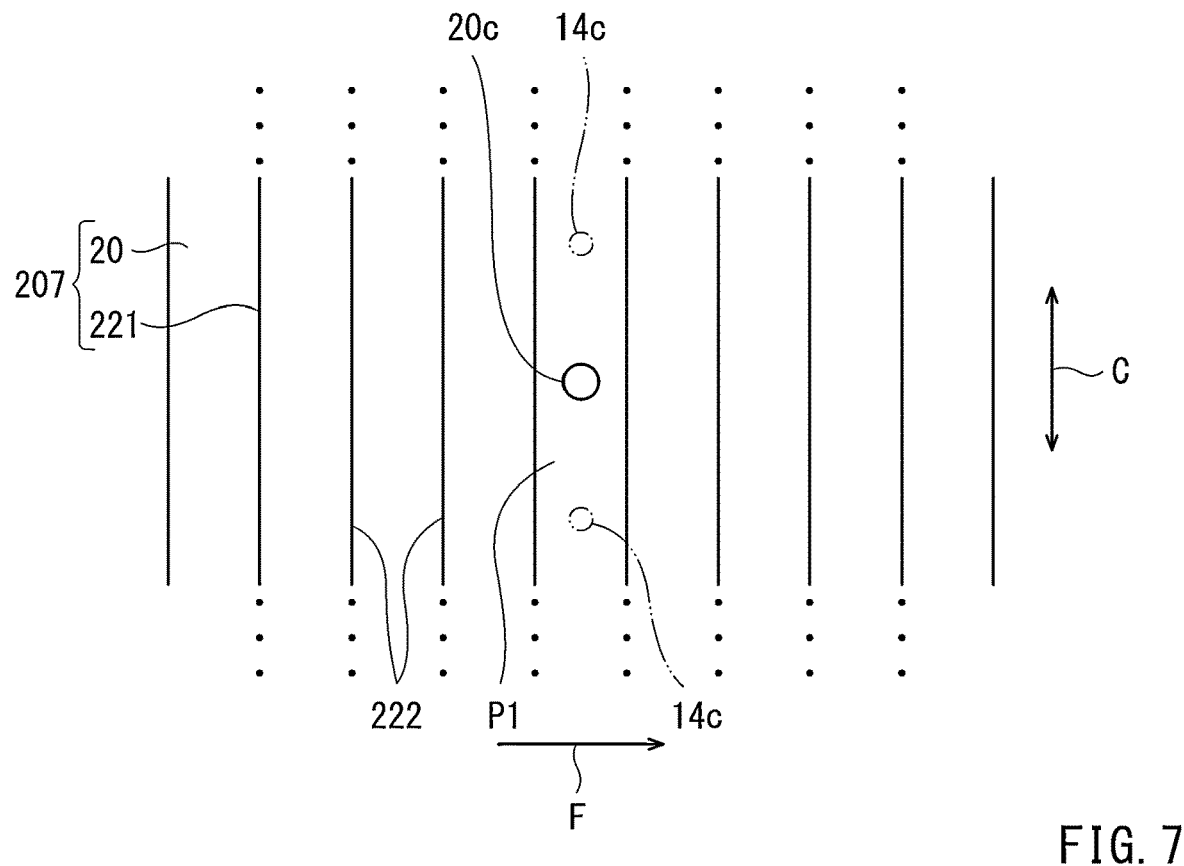
FIG. 7 is a partial development view showing a second modified example of the seal wall structure of FIG. 5 when viewed in the projecting direction of the seal wall structure.

The seal wall structure 21 is not limited to the above configuration, and various modified examples may be adopted. FIG. 6 is a partial development view showing a first modified example of the seal wall structure 21 of FIG. 5 when viewed in the projecting direction of the seal wall structure 21. As shown in FIG. 6, as the first modified example, a seal structure 121 of a shell 107 may have a lattice shape when viewed in a direction in which the seal structure 121 projects from the shell main body 20. FIG. 7 is a partial development view showing a second modified example of the seal wall structure 21 of FIG. 5 when viewed in the projecting direction of the seal wall structure 21. As shown in FIG. 7, as the second modified example, a seal wall structure 221 of a shell 207 may include wall portions 222 which extend in the circumferential direction C and are spaced apart from each other in the flow direction F, and may not include wall portions extending in the flow direction F. To be specific, the seal wall structure 221 may have a stripe shape when viewed in a direction in which the seal wall structure 221 projects from the shell main body 20. Cavities P1 separated from each other by the wall portions 222 may extend continuously and entirely in the circumferential direction C.

Figure 8:
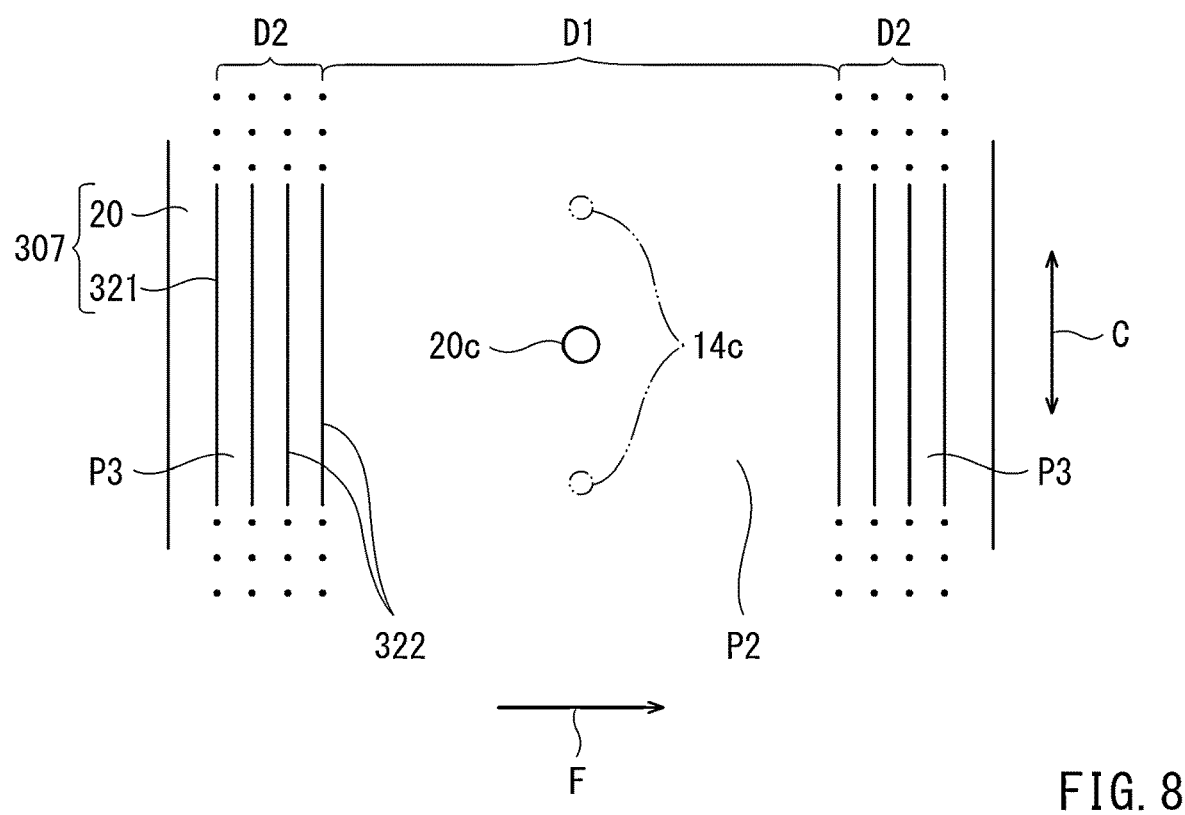
FIG. 8 is a partial development view showing a third modified example of the seal wall structure of FIG. 5 when viewed in the projecting direction of the seal wall structure.

FIG. 8 is a partial development view showing a third modified example of the seal wall structure 21 of FIG. 5 when viewed in the projecting direction of the seal wall structure 21. As shown in FIG. 8, as the third modified example, a seal wall structure 321 of a shell 307 may include wall portions 322 which extend in the circumferential direction C and are located at irregular intervals in the flow direction F. To be specific, the seal wall structure 321 may have a stripe shape including irregular intervals when viewed in a direction in which the seal wall structure 321 projects from the shell main body 20. For example, an arrangement pitch of the wall portions 322 in the flow direction F in a first region D1 corresponding to the cooling holes 14c may be set larger than that in a second region D2 located away from the first region D1 in the flow direction F. To be specific, a width of a cavity P2 in the flow direction F in the region which corresponds to the cooling holes 14c may be larger than a width of a cavity P3 in the flow direction F in the region which is located away from the cooling holes 14c in the flow direction F. Moreover, instead of the configurations shown in FIGS. 5 to 8, the seal wall structure may have a labyrinth shape.

The foregoing has described the embodiment as an example of the technology disclosed in the present application. However, the technology in the present disclosure is not limited to this and is applicable to embodiments in which modifications, replacements, additions, omissions, and the like have been suitably made. Moreover, a new embodiment may be prepared by combining the components described in the above embodiment. For example, some of components or methods in one embodiment may be applied to another embodiment. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

The invention claimed is:

1. A combustor of a gas turbine, the combustor comprising:
   a shell including metal, the shell including an opening into which compressed air is introduced;
   a liner located inside the shell and including a ceramic matrix composite, the liner including
      an inner surface defining a combustion chamber,
      an outer surface facing a side opposite to a side where the combustion chamber is located, and
      at least one cooling hole that is open toward the combustion chamber; and
   a cooling chamber defined between the shell and the liner, wherein
   the shell includes
      a tubular shell main body and
      a seal wall structure projecting from an inner surface of the shell main body toward the liner;
   a tip of the seal wall structure is spaced apart from the outer surface of the liner;
   in a section of the cooling chamber when viewed in a circumferential direction of the combustor, the seal wall structure divides the cooling chamber into cavities
   one of the cavities is interposed between the cooling hole of the liner and the opening of the shell,
   the opening of the shell overlaps the cooling hole of the liner, viewed from a direction in which the seal wall structure protrudes.

2. The combustor according to claim 1, wherein the liner includes panels which are adjacently lined up in a circumferential direction of the combustor.

3. The combustor according to claim 1, further comprising a fastener by which the liner is attached to the shell, wherein:
   the fastener includes a spring that allows displacement of the liner relative to the shell in a radial direction of the combustor.

4. The combustor according to claim 3, wherein the gap is set such that the tip of the seal wall structure is maintained to be spaced apart from the outer surface of the liner in an entire temperature range of the combustion chamber during operation of the gas turbine.

5. The combustor according to claim 1, wherein:
   the seal wall structure includes wall portions projecting from the shell main body toward the liner; and
   in the section of the cooling chamber when viewed in the circumferential direction of the combustor, the wall portions are lined up at intervals in a direction toward an end of the liner from the cavity that the cooling hole faces among the cavities.

6. The combustor according to claim 1, wherein in a section of the cooling chamber when viewed in a flow direction from an upstream side to a downstream side in the combustor, the seal wall structure divides the cooling chamber into further cavities.

7. The combustor according to claim 1, wherein:
   the at least one cooling hole comprises cooling holes; and
   when viewed in a direction in which the seal wall structure projects, the seal wall structure separates the cooling holes from each other.

8. The combustor according to claim 1, wherein the seal wall structure has a honeycomb shape, a lattice shape, or a stripe shape when viewed in a direction in which the seal wall structure projects from the shell main body.

* * * * *